United States Patent

Chang

[11] Patent Number: 6,072,710
[45] Date of Patent: Jun. 6, 2000

[54] REGULATED SELF-OSCILLATING RESONANT CONVERTER WITH CURRENT FEEDBACK

[75] Inventor: Chin Chang, Yorktown Heights, N.Y.

[73] Assignee: Philips Electronics North America Corporation, New York, N.Y.

[21] Appl. No.: 09/221,953

[22] Filed: Dec. 28, 1998

[51] Int. Cl.$^7$ .................. H02M 7/5387; H05B 37/02
[52] U.S. Cl. ........................... 363/132; 315/209 R
[58] Field of Search .................. 363/17, 98, 132; 315/209 R, 219, 220, 237

[56] References Cited

U.S. PATENT DOCUMENTS

| | | | |
|---|---|---|---|
| 5,382,882 | 1/1995 | Nerone | 315/307 |
| 5,619,106 | 4/1997 | Secen | 315/290 |
| 5,677,601 | 10/1997 | Zuchtriegel | 315/209 R |
| 5,757,140 | 5/1998 | Nilssen | 315/209 R |
| 5,757,143 | 5/1998 | Matucci et al. | 315/247 |

OTHER PUBLICATIONS

"A Mathematical Model of the Class D Converter for Compact Fluorescent Ballasts", by Louis R. Nerone, IEEE Transactions on Power Electronics, vol. 10, No. 6, Nov. 1995.

*Primary Examiner*—Matthew Nguyen
*Attorney, Agent, or Firm*—Bernard Franzblau

[57] ABSTRACT

Lamp voltage or current obtained from a self-oscillating converter is stabilized by a feedback circuit. Gates of the switching transistors are connected to output windings of a current transformer whose input current winding is in series with the resonant load lamp circuit. The lamp voltage or current is sensed, and the resulting signal is used to control current through an auxiliary control winding on the current transformer. Preferably, two opposite conductivity type control transistors are connected in parallel across the control winding, and low-pass filtered DC signals corresponding to the lamp voltage or current bias the control transistors.

23 Claims, 2 Drawing Sheets

REGULATED SELF-OSCILLATING RESONANT CONVERTER WITH CURRENT FEEDBACK

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to electronic ballasts for operating discharge lamps such as fluorescent lamps, and in particular to such ballasts used in applications where a variation of lamp operating parameters is undesirable, whether due to ambient temperature, line voltage or other variations.

Most magnetically coupled self-oscillating inverters are manufactured in large quantities for sale in a highly competitive market. Half-bridge inverters generally have a lower cost because of a reduced parts count. Such inverters may be classified into two groups: those using a current transformer having a saturable core, generally together with power BJT's (bipolar junction transistors); and those using a current transformer having a linear core, generally together with MOSFETs (metal oxide semiconductor field effect transistors). As those of ordinary skill will recognize, in this context a linear core is one in which operation is over a region having a curved B-H characteristic, rather than a sharp B-H characteristic; that is, at all times the flux level is such that a significant increase in magnetizing current will be accompanied by a significant increase in flux level.

In designing a lamp ballast with a saturable core, the storage time of the power BJT occupies a large portion of a switching period, and is a complicated function of the forward base current, the reverse base current, the current gain in the saturation mode, the collector current and the minority carrier life time in the base. This large number of variables and affecting factors causes the circuit to be sensitive to its operating environment, and the circuit operating point changes with load and input power line voltage variations, changes in ambient temperature, and the like.

A mathematical analysis of fluorescent lamp converters of the half-bridge MOSFET type is found in an article by L. R. Nerone, "A Mathematical Model of the Class D Converter for Compact Fluorescent Ballasts," IEEE Transactions on Power Electronics, vol. 10, no. 6, Nov. 1995 at pp 708–715. FIG. 3 of this article shows a schematic diagram of such a converter having a current transformer in series with a resonant load circuit. The current transformer has a primary or load current winding $T_{1c}$ which senses the converter output current and provides control signals directly from output windings $T_{1a}$ and $T_{1b}$ on the current transformer to the gates of the MOSFETs. The fluorescent lamp is connected in parallel with a tuning capacitor C, and this combination is in series with a resonance inductor L. This circuit has the disadvantage that it is quite sensitive to the DC voltage supplied to the half-bridge circuit. Footnote 1 on page 710 points out that a variation of this circuit, in which the capacitor current itself is sensed, can sometimes be used to reduce sensitivity to power line variations. Further, as pointed out at page 712, the need for the converter to operate at close to the resonant frequency of the series RLC circuit, in order to develop a high voltage to ignite the lamp, and then operate with correct phase in the gate driving circuit although the load current is lagging, impose strict requirements on the circuit. The situation can be additionally complicated if the current due to gate capacitance becomes significant.

BRIEF SUMMARY OF THE INVENTION

An object of the invention is to provide an electronic lamp ballast in which variations of output applied to the lamp, due to changes in line voltage or ambient temperature, are minimized.

Another object of the invention is to provide an electronic lamp ballast which does not require a regulated DC power supply, but has a regulated output.

According to the invention, a half-bridge converter for operating a discharge lamp includes two field effect switching transistors having an output node between them, and a linear core current transformer having a load winding through which the converter output current passes and at least one output winding for providing control signals to the switching transistor gates. The converter has a feedback and regulation circuit which senses one of the operating parameters of the lamp: voltage across the lamp, current through the lamp, or power consumed by the lamp. Responsive to the sensed parameter, the feedback and regulation circuit causes an AC control current to flow through a control winding on the current transformer. The control current determines the switching instant of the two FETs and thereby varies the oscillating frequency so as to maintain lamp voltage constant.

In a preferred embodiment of the invention, two control transistors are connected in parallel across the control winding, for conducting current in opposite directions. Each control transistor is controlled by a respective rectifying and filtering circuit which is connected through its rectifier to sense the voltage at one of the lamp terminals. The rectified lamp voltage is filtered by a low pass filter and applied to a control terminal of the respective control transistor.

Preferably the transistors are MOSFETS, and the transformer output windings are two gate signal windings, each directly connected to a gate of a respective MOSFET. In normal operation the current through the control winding is a major factor in determining the instants of triggering the MOSFETs, and thereby controls the converter frequency.

In another embodiment, a similar feedback and regulation circuit has a current sensor which senses the lamp current, for example by use of a current transformer. Any other kind of current sensor can also be employed, such as one which senses the magnetic field produced. Further, by sensing both lamp voltage and lamp current, and multiplying the instantaneous values sensed, lamp power can also be determined so that it is the parameter to which the feedback is responsive.

Because the switching transistors are field effect transistors, they do not draw any significant control element current, and therefore do not load down or cause variation in the gain of the feedback circuit.

DETAILED DESCRIPTION OF THE INVENTION

Figure 1:
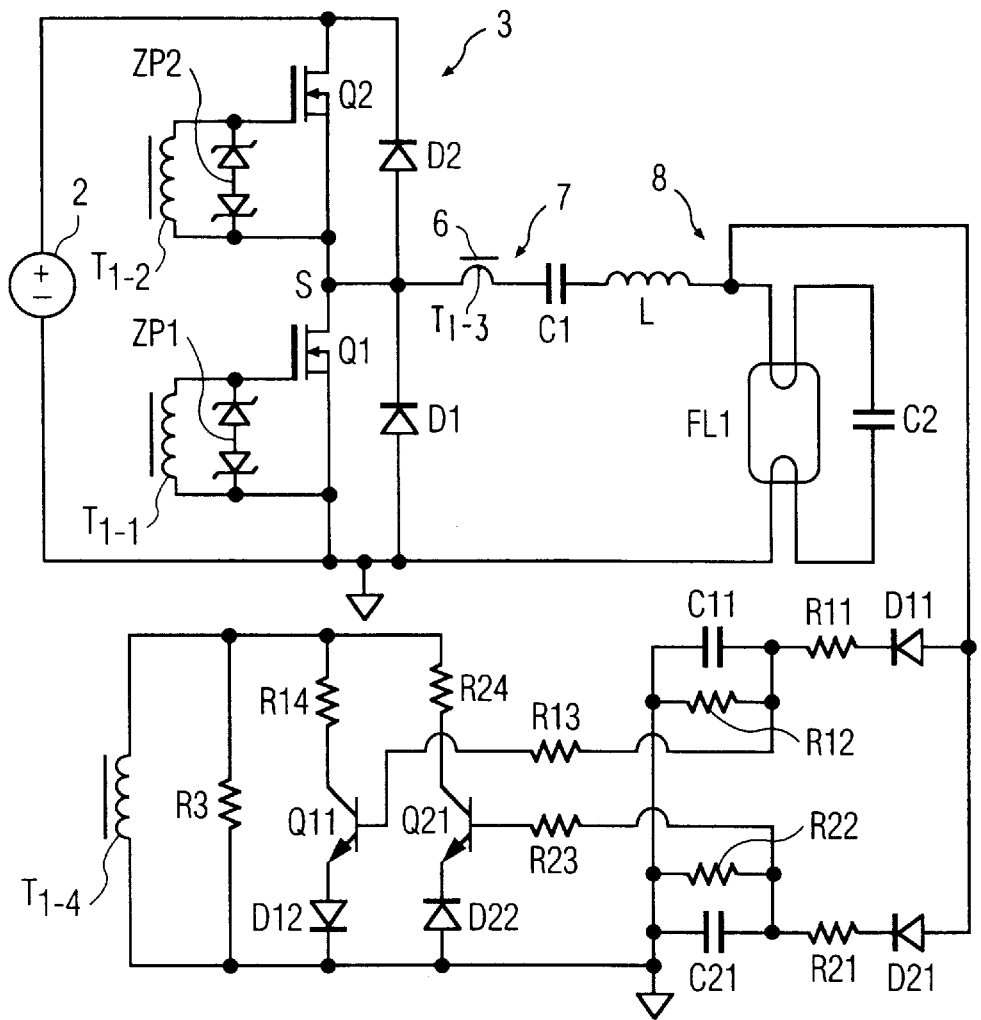
FIG. 1 is a schematic diagram of a converter embodying the invention.

The circuit embodiment shown in FIG. 1 exemplifies the underlying concept of the invention. A DC voltage supply 2, which is of any common type but will usually be a bridge rectifier or a voltage doubler supply connected to an AC supply, provides a DC high voltage to an FET inverter 3. Switching of the FETs is controlled by output windings $T_{1-1}$ and $T_{1-2}$ on the linear core 6 of a current transformer 7 having a load winding $T_{1-3}$ through which load current passes to a load 8.

The inverter 3 includes two MOSFET switching transistors Q1 and Q2 connected in series between the DC voltage bus and signal ground, and have a midpoint node S providing the inverter output. Protective diodes D1 and D2 are connected across the respective switching transistor current paths. Alternatively, the body diodes of the respective MOSFETs could perform this function. To convert the current signal to a voltage signal, a zener diode pair ZP1 and ZP2 is connected between each switching transistor gate and its source electrode. These diode pairs provide a path for the current through the current transformer output windings $T_{1-1}$ and $T_{1-2}$, and they also prevent overvoltage damage to the switching transistor gates.

A resonant load circuit is connected between node S and signal ground. The primary winding $T_{1-3}$ of the linear core transformer 6 presents a very low impedance in the circuit, and need not be considered when evaluating the resonant circuit operation. A DC blocking capacitor C1 having a relatively large capacitance is connected between the winding $T_{1-3}$ and a resonant inductor L, which in turn is in series with a capacitor C2 across which a fluorescent lamp FL is connected.

Figure 3:
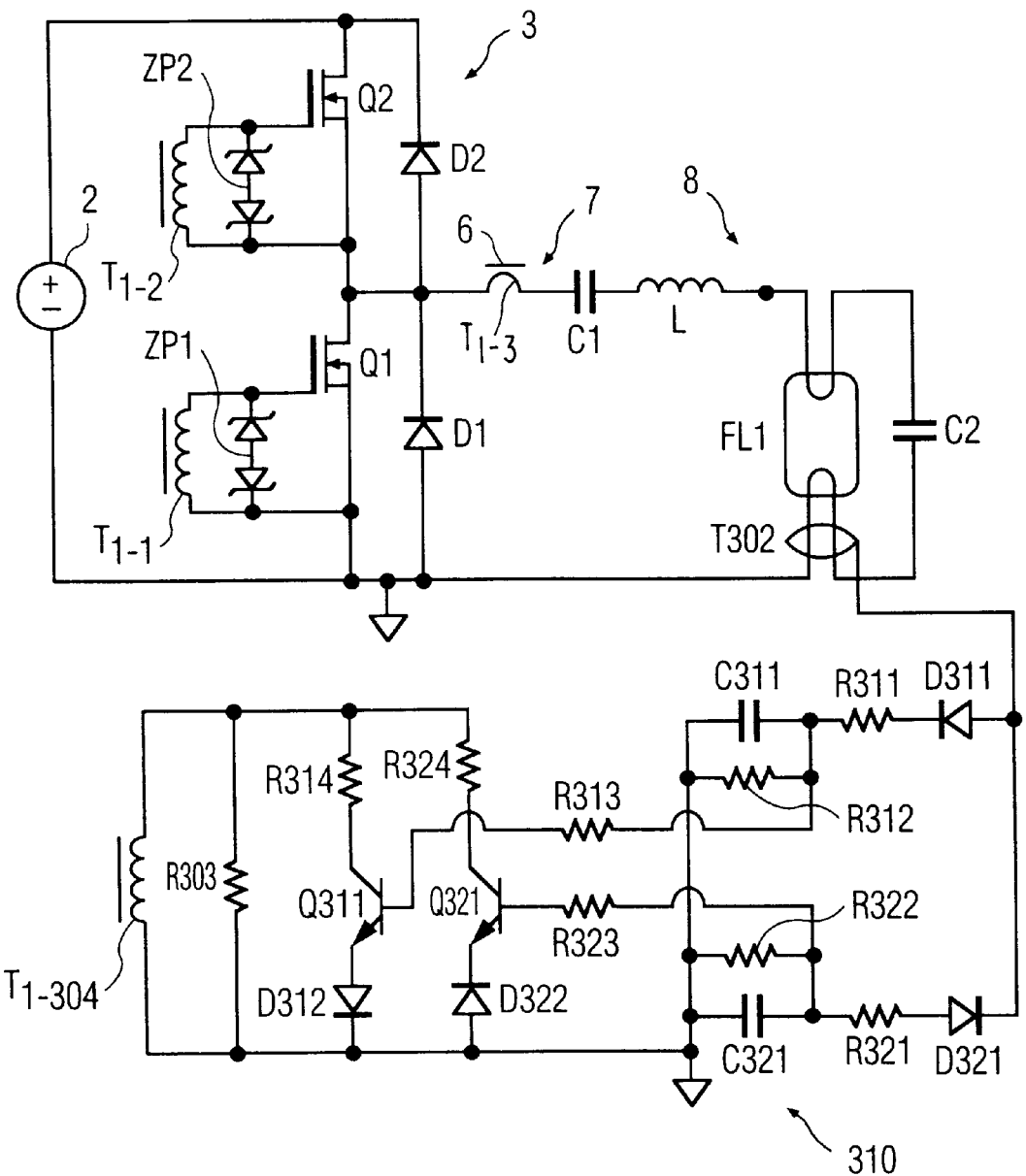
FIG. 3 is a schematic diagram of a converter embodying the invention for control of lamp current.

As described thus far, the circuit of FIG. 1 is the same as FIG. 3 of the Nerone article cited above. According to the invention, a feedback circuit 10 is connected between the lamp FL and a control winding $T_{1-4}$ on the core 6 of the transformer 7. The lamp voltage is applied to two circuits which are identical except for their polarities. The anode and cathode respectively of diodes D11 and D21 are connected to respective DC filters formed by series resistors R11 and R21 and capacitors C11 and C21 connected between the series resistors and signal ground. Resistors R12 and R22 are connected across the capacitors C11 and C21, and together with resistors R11 and R21 form voltage dividers which set the bias level described below.

Opposite conductivity type bipolar control transistors Q11 and Q21 are connected across the control winding $T_{1-4}$, and have their base electrodes connected to the respective capacitors C11 and C21 through resistors R13 and R23. The control transistors are connected in series with respective diodes D12, D22, which protect the transistors from reverse current flow, and resistors R14, R24 which are one of the factors defining the gain of the feedback circuit. A further resistor R3 is also connected across the winding $T_{1-4}$ to provide proper damping and bias.

In operation, the voltages across C11, C21 are DC voltages proportional to the positive and negative half-cycles of the lamp voltage. The resulting changes in the base voltages of the control transistors function to alter the switching periods of the switching transistors, thereby changing the self-resonant frequency of the inverter.

It is well-known that the output voltage applied to the lamps will change if the inverter frequency changes. Correspondingly, the controlled change of inverter frequency due to the current feedback reduces the change in lamp voltage which would otherwise result from changes in ambient temperature or line voltage.

Figure 2:
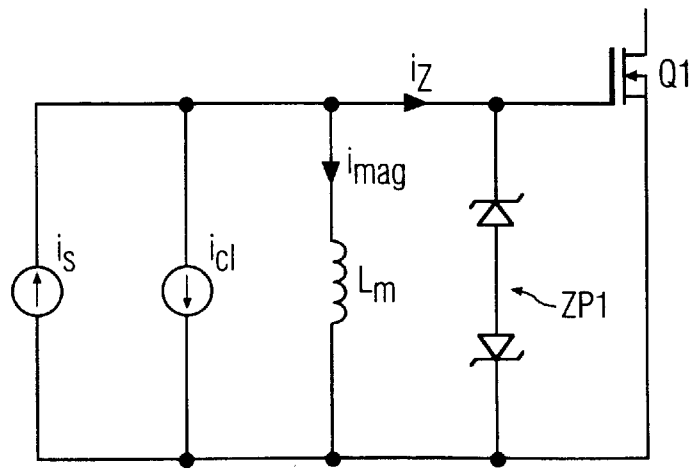
FIG. 2 is a schematic diagram of the equivalent gate drive circuit for the embodiment of FIG. 1.

The operation of the circuit can be analyzed mathematically by noting that, according to Ampere's Law, $$\oint H * dl = N3 * i_L + N2 * i_s + N1 * i_s + N4 * i_c \qquad (1)$$

where N is the number of turns of the respective winding, $i_L$ is the current through the inductor and the winding $T_{1-3}$, $i_s$ is the current in the feedback windings, and $i_c$ is the current in the control winding. This can be simplified, because N2 and N1 are equal and may be considered equal to N. Further, as shown in FIG. 2, the magnetizing inductance of the current transformer is reflected to the gate drive circuit as $L_m$ and the control winding is also reflected as a current source $i_{c1}$ which equals $(N4/2N)i_c$. Thus in the equivalent circuit $$i_z = (i_s - i_{c1}) - i_{mag} \qquad (2)$$

where $i_z$ is the zener diode current (treating the gate to source capacitance of the MOSFET as zero) and $i_{mag}$ is the reflected magnetizing current of the transformer. From this it follows that, when the magnetizing current exceeds the difference between the feedback current $i_s$ and the control current $i_{c1}$, $i_z$ changes sign and the gate voltage changes polarity, which turns off the MOSFET.

The relationship of turn-off time to inverter frequency can be described via the relationship $$i_{mag} = (V_{z/Lm})(t + (\Phi - \pi/2)/\omega) \qquad (3)$$

where $v_z$ is the zener diode breakdown voltage, $L_m$ is the magnetizing inductance reflected to the gate drive circuit of Q1, $\Phi$ is the phase angle between the resonant circuit input current and the voltage applied to the resonant circuit by the half-bridge inverter, and $\omega$ is the inverter frequency. Assuming steady state operation with high Q in the resonant circuit, the current $i_L$ is a sinusoid with peak value $I_p$ so that $$i_L(t) = -I_p \sin(\omega t). \qquad (4)$$

At the instant of switching $$i_s(\pi - \Phi) = i_{mag}((\pi - \Phi)/\omega). \qquad (5)$$

From equation (3) we can then determine $$\sin(\Phi) = N\pi v_z / N3 * I_p \omega L_m. \qquad (6)$$

Equation (6) together with the resonant tank parameters governs the self oscillation operation of the circuit. Where $i_s$ includes the effect of the control current $i_{c1}$ the inverter is regulated against variations.

From the above equations and analysis it is clear that injection of the control signal $i_c$ changes the inverter frequency, and tends to maintain the lamp voltage constant independent of input line voltage variation, load resistance changes, or other drifts. If the lamp FL is removed, in the absence of the feedback an excessive high voltage will appear at the lamp terminals. This increases the magnitude of $i_{c1}$ so that $(i_s - i_{c1})$ is approximately zero. This results in turning off both switches Q1 and Q2, and provides embedded over voltage protection.

Other details of a practical converter are easily devised by one of ordinary skill, and are not critical to the practice of the invention. For example, the DC supply 2 is preferably any well-known full wave rectifier design having an appropriate fuse and RF noise filter, but less expensive or simplified designs may be acceptable in some applications. The lamp circuit may be different, so long as a node or sensor exists from which a signal reasonably proportional to lamp voltage or current can be obtained.

The embodiment of FIG. 3 is like that of FIG. 1, except that the feedback circuit is arranged to minimize lamp current variations. Identical reference numerals are used where the element function is identical and the circuit values would probably be the same, while other circuit element values may, for design and construction optimization, be different. The inverter and load circuit thus may be identical to those of FIG. 1. A feedback circuit 310 is connected between a current transformer T302 and a control winding $T_{1-304}$ on the core 6 of the transformer 7. The current transformer T302 measures the actual lamp current. For example, the two conductors connected to a filament of the lamp FL1 may pass through a core, so that the core senses the differential current which is the actual arc current. The signal proportional to the lamp current is applied to two circuits which are identical except for their polarities. Similar to the circuit of FIG. 1, the anode and cathode respectively of diodes D311 and D321 are connected to respective DC filters formed by series resistors R311 and R321 and capacitors C311 and C321 connected between the series resistors and signal ground. Resistors R312 and R322 are connected across the capacitors C311 and C321, and together with resistors R311 and R321 form voltage dividers which set the bias level described below.

Opposite conductivity type bipolar control transistors Q311 and Q321 are connected across the control winding $T_{1-304}$, and have their base electrodes connected to the respective capacitors C311 and C321 through resistors R313 and R323. The control transistors are connected in series with respective diodes D312, D322, which protect the transistors from reverse current flow, and resistors R314, R324 which are one of the factors defining the gain of the feedback circuit. A further resistor R303 is also connected across the winding $T_{1-304}$ to provide proper damping and bias.

In operation, the voltages across C311, C321 are DC voltages proportional to the positive and negative half-cycles of the lamp current. The resulting changes in the base voltages of the control transistors function to alter the switching periods of the switching transistors, thereby changing the self-resonant frequency of the inverter. Thus the controlled change of inverter frequency due to the current feedback reduces the change in lamp current which would otherwise result from changes in ambient temperature or line voltage.

In these preferred embodiments both the resonant inductor and the current transformer core are operated in the generally linear range of flux. While the ballast embodiments disclosed are intended for a single lamp, it is well known that multiple lamp embodiments are feasible. Appropriate starting circuits would, of course, need to be provided. Accordingly, the scope of the invention should be limited only by the appended claims.

What is claimed is:

1. A self-oscillating resonant converter for at least one discharge lamp which during normal operation exhibits lamp operating parameters of lamp voltage, lamp current and lamp power, wherein the converter comprises a half-bridge inverter including two field effect transistors and an output node between said transistors, a gate driving circuit for controlling said field effect transistors, and a linear core transformer having a load winding through which load current passes, the load winding having one end connected to the output node, characterized in that the transformer includes a control winding, and the converter further comprises means for controlling the gate driving circuit during the normal operating state of the lamp to vary the oscillating frequency so as to maintain one of the lamp operating parameters constant, said means including a feedback and regulation circuit connected to and producing an AC control current in said control winding.

2. A self-oscillating resonant converter for at least one discharge lamp which during normal operation exhibits lamp operating parameters of lamp voltage, lamp current and lamp power, wherein the converter comprises a half-bridge inverter including two field effect transistors and an output node between said transistors, a gate driving circuit for controlling said field effect transistors, and a linear core transformer having a load winding through which load current passes, the load winding having one end connected to the output node, characterized in that the transformer includes a control winding, and the converter further comprises means for controlling the gate driving circuit to vary the oscillating frequency so as to maintain one of the lamp operating parameters constant, said means including a feedback and regulation circuit connected to and producing an AC control current in said control winding, and the feedback and regulation circuit include means for sensing the lamp voltage, and the control current is responsive to the sensed voltage.

3. A converter as claimed in claim 2, characterized in that said transformer further includes a first gate signal winding connected to a control gate of one of said field effect transistors, and a second gate signal winding connected to a control gate of the other of said field effect transistors.

4. A converter as claimed in claim 3, characterized in that said gate signal windings are connected directly to the respective control gates, two respective opposite polarity zener diodes are connected in series across each gate signal winding, and said gate signal windings are free from loading by any additional circuits.

5. A converter as claimed in claim 3, characterized in that said feedback and regulation circuit includes a first rectifying and filtering circuit for providing a first unidirectional voltage having a first polarity, and a unidirectional current control circuit responsive to said first unidirectional voltage.

6. A converter as claimed in claim 5, characterized in that said unidirectional current control circuit comprises a first control transistor having a current path, the first control transistor being connected across the control winding to permit current to pass through the control winding in one direction, and said feedback and regulation circuit comprises a second control transistor connected across the control winding to permit current to pass through the control winding in a direction opposite the one direction.

7. A converter as claimed in claim 6, characterized in that said first rectifying and filtering circuit comprises a low-pass filter.

8. A converter as claimed in claim 7, characterized in that said low pass filter includes an input resistor and a shunt resistor connected in parallel with a capacitor, said input resistor and shunt resistor forming a voltage divider which provides bias for said first control transistor.

9. A converter as claimed in claim 8, characterized in that said control transistors are bipolar junction transistors having respective base electrodes, and the low pass filter further includes a further resistor connected between the voltage divider and the base electrode of the first control transistor.

10. A converter as claimed in claim 6, characterized in that said feedback and regulation circuit includes a second rectifying and filtering circuit providing a second unidirectional voltage having a polarity opposite said first polarity, for controlling said second control transistor.

11. A converter as claimed in claim 10, characterized in that said feedback and regulation circuit further comprises a respective protective diode connected in series with each control transistor.

12. A converter as claimed in claim 1, characterized in that the feedback and regulation circuit include means for sensing the lamp current, and the control current is responsive to the sensed current.

13. A converter as claimed in claim 12, characterized in that said means for sensing the lamp current includes a current transformer.

14. A converter as claimed in claim 13, characterized in that said current transformer is a differential current transformer having a core through which both conductors connected to a lamp filament pass.

15. A converter as claimed in claim 12, characterized in that:
    said transformer further includes a first gate signal winding connected to a control gate of one of said field effect transistors, and a second gate signal winding connected to a control gate of the other of said field effect transistors,
    said gate signal windings are connected directly to the respective control gates,
    two respective opposite polarity zener diodes are connected in series across each gate signal winding, and
    said gate signal windings are free from loading by any additional circuits.

16. A self-oscillating resonant converter for at least one discharge lamp which during normal operation exhibits lamp operating parameters of lamp voltage, lamp current and lamp power, wherein the converter comprises a half-bridge inverter including two field effect transistors and an output node between said transistors, a gate driving circuit for controlling said field effect transistors, and a linear core transformer having a load winding through which load current passes, the load winding having one end connected to the output node,
    characterized in that the transformer includes a control winding, and
    the converter further comprises means for controlling the gate driving circuit to vary the oscillating frequency so as to maintain one of the lamp operating parameters constant, said means including a feedback and regulation circuit connected to and producing an AC control current in said control winding,
    the feedback and regulation circuit include means for sensing the lamp current, and the control current is responsive to the sensed current, wherein said feedback and regulation circuit includes a first rectifying and filtering circuit for providing a first unidirectional voltage having a first polarity, and a unidirectional current control circuit responsive to said first unidirectional voltage,
    said unidirectional current control circuit comprises a first control transistor having a current path, the first control transistor being connected across the control winding to permit current to pass through the control winding in one direction, and
    said feedback and regulation circuit comprises a second control transistor connected across the control winding to permit current to pass through the control winding in a direction opposite the one direction.

17. A converter as claimed in claim 16, characterized in that said first rectifying and filtering circuit comprises a low-pass filter including an input resistor and a shunt resistor connected in parallel with a capacitor, said input resistor and shunt resistor forming a voltage divider which provides bias for said first control transistor.

18. A converter as claimed in claim 17, characterized in that said control transistors are bipolar junction transistors having respective base electrodes, and the low pass filter further includes a further resistor connected between the voltage divider and the base electrode of the first control transistor.

19. The resonant converter as claimed in claim 16 wherein said feedback and regulation circuit includes a second rectifying and filtering circuit providing a second unidirectional voltage having a polarity opposite said first plurality, for controlling said second control transistor.

20. The resonant converter as claimed in claim 1 wherein said gate driving circuit includes gate signal winding means of said transformer and coupled to respective control gates of the two field effect transistors so as to alternately turn the two field effect transistors on and off during normal operation of the discharge lamp and at an oscillating frequency of the converter determined in part by the control current in said control winding.

21. The resonant converter as claimed in claim 1 wherein said feedback and regulation circuit, in the event of an abnormally high voltage at the discharge lamp terminals, produces in the control winding a current of a value that will turn off both of said two field effect transistors via the gate driving circuit.

22. The resonant converter as claimed in claim 1 which further comprises a resonant circuit including an inductor and a capacitor connected in series circuit with the transformer load winding and with the capacitor connected across connection terminals for the discharge lamp.

23. The resonant converter as claimed in claim 22 wherein the inductor is a linear core inductor, and both the inductor and transformer are operated in the linear region of their respective B/H characteristics.

* * * * *